United States Patent [19]
Kennicuit

[11] 3,873,148
[45] Mar. 25, 1975

[54] VEHICLE FRAME
[75] Inventor: Robert B. Kennicuit, Morton, Ill.
[73] Assignee: Caterpillar Tractor Co., Peoria, Ill.
[22] Filed: Dec. 27, 1972
[21] Appl. No.: 318,821

[52] U.S. Cl......... 296/28 R, 214/131 A, 280/106 R
[51] Int. Cl............................................ B62d 33/00
[58] Field of Search............... 296/28 R; 280/106 R; 214/145, 620, 778, 131 A

[56] References Cited
UNITED STATES PATENTS
| | | | |
|---|---|---|---|
| 3,134,493 | 5/1964 | King.............................. | 214/778 X |
| 3,725,996 | 4/1973 | Skanes............................ | 296/1 R |

*Primary Examiner*—David Schonberg
*Assistant Examiner*—John A. Pekar
*Attorney, Agent, or Firm*—Phillips, Moore, Weissenberger Lempio & Strabala

[57] ABSTRACT

A frame for a tractor includes a pair of spaced plates having upwardly extending portions with ears fixed thereto, for a mounting of a roll-over protective structure or tractor implement means thereto. Additional plates may be fixed to these spaced plates along the upwardly extending portions thereof, and, with apertures properly provided therein, such additional plates allow the mounting of implement means thereon. Such upwardly extending portions and additional plates may be eliminated completely, if desired.

7 Claims, 4 Drawing Figures

VEHICLE FRAME

BACKGROUND OF THE INVENTION

This invention relates to a frame attachment for a vehicle, and more particularly, to such a frame attachment which may incorporate various structural changes so as to secure bulldozer or loader implements.

Many earth-moving vehicle manufacturers make several types of earth-moving vehicles, some of which have the same basic design. For example, many of the components of a tracktype loader are similar or identical to corresponding components of a crawler-tractor. By using an identical basic component, allowing for a degree of easy modification, for two different types of vehicles, the tooling and manufacturing costs for each component will generally be lower than when a different component is used for each vehicle. Furthermore, the more components the vehicles have in common, the lower the cost of each individual vehicle.

While U.S. Pat. No. 2,755,572 to Pilch, U.S. Pat. No. 2,843,947 to Anderson et al, U.S. Pat. No. 3,335,884 to Termont et al, and U.S. Pat. No. 2,878,598 to Pilch disclose vehicle frames generally of the type herein described, only U.S. Pat. No. 2,755,572 and U.S. Pat. No. 2,843,947 define frames of the type designed to be useful in different vehicle functions. And while these frames can be so used, they do not allow for simple modifications thereof so as to be best suited for the chosen uses. Nor is there any provision for use in conjunction with, for example, a vehicle roll-over protective structure.

SUMMARY OF THE INVENTION

It is an object of this invention to provide a vehicle frame which incorporates a basic design which may be easily altered to lend the vehicle to a variety of uses.

It is a further object of this invention to provide a vehicle frame which, while fulfilling the above object, is simple in design and manufacture.

Broadly stated, the invention comprises a frame for a vehicle, such frame comprising first and second generally parallel spaced-apart side plates, defining first and second forwardly extending portions and first and second rear portions, respectively, and first and second upwardly extending portions extending from the first and second rear portions respectively. Brace means interconnect the first and second upwardly extending portions. Further included are first and second ears fixed relative to and generally parallel to the first and second upwardly extending portions respectively and in spaced-apart relation thereto. The first ear and first upwardly extending portion define coaxial apertures, and the second ear and second upwardly extending portion define coaxial apertures. Means are included for attaching said first and second side plates relative to the vehicle.

BRIEF DESCRIPTION OF THE DRAWINGS

These and other objects of the invention will become apparent from the study of the following specification and drawings, in which.

DESCRIPTION OF THE PREFERRED EMBODIMENT

Figure 1:
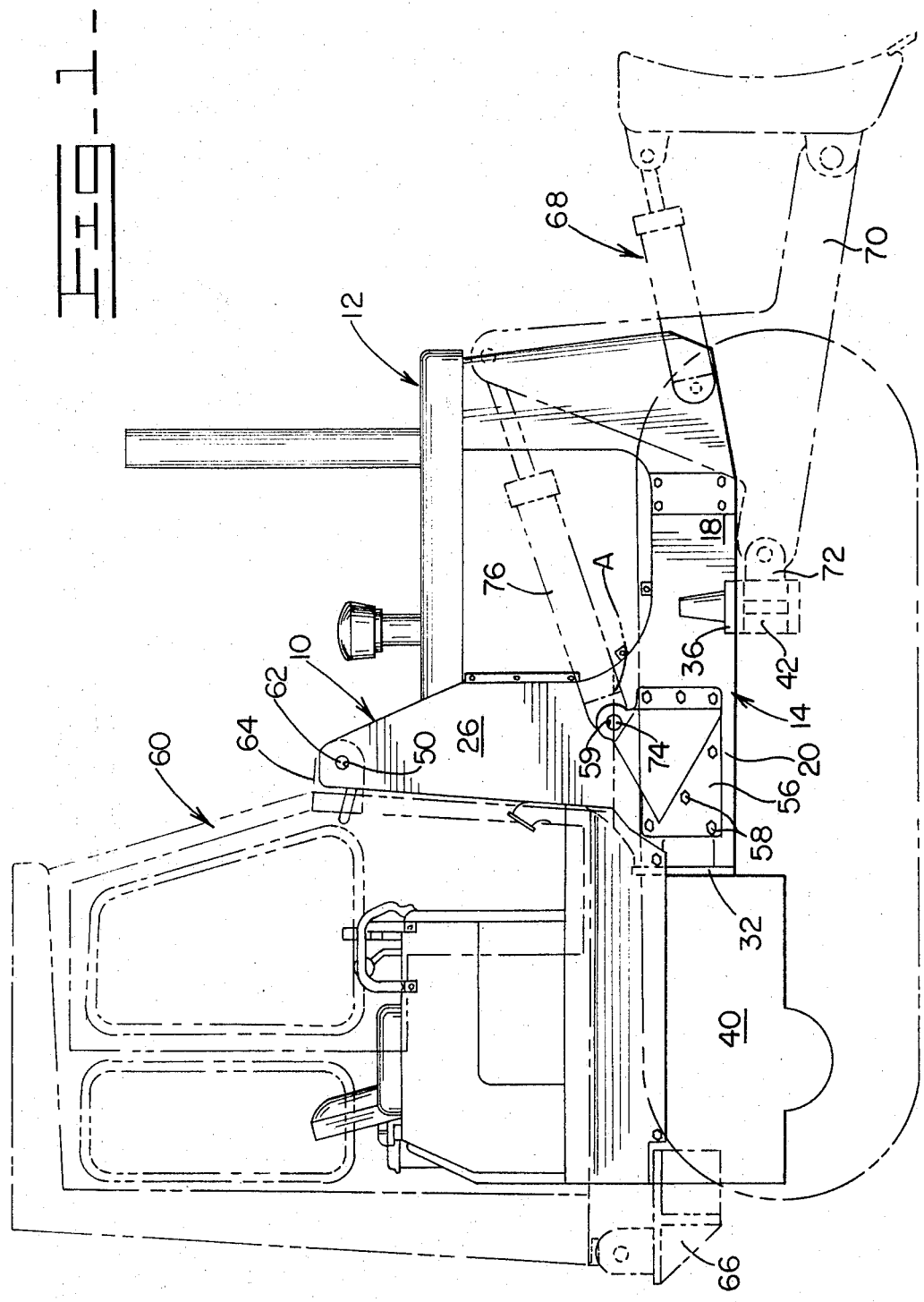
FIG. 1 is a side elevation of a vehicle incorporating the inventive frame in one form thereof.
Figure 2:
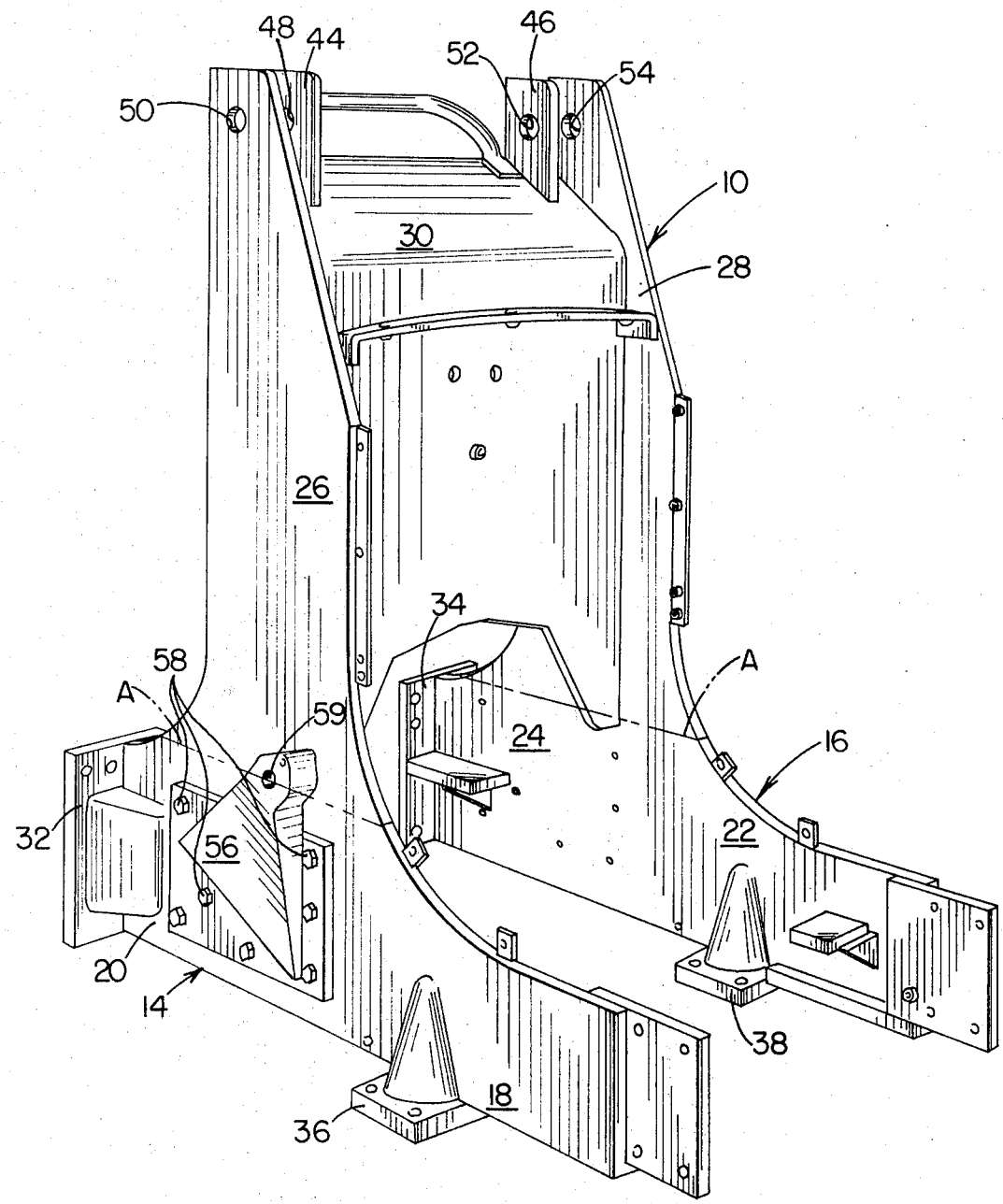
FIG. 2 is a perspective view of the frame as incorporated in the vehicle of FIG. 1.

Referring initially to FIGS. 1 and 2 of the drawings, a vehicle frame is generally indicated by the reference numeral 10. Such vehicle frame 10 is in association with a crawler tractor 12. The frame 10 has generally parallel spaced-apart side plates 14, 16. The side plate 14 defines a forwardly extending portion 18 and a rear portion 20. Likewise, the side plate 16 defines a forwardly extending portion 22 and a rear portion 24. Upwardly extending portions 26, 28 extend from the rear portion 20, 24. A brace 30 is fixed to and interconnects the upwardly extending portions 26, 28.

The rear portions 20, 24 have fixed thereto and facing rearwardly thereof mounting pads 32, 34. The forwardly extending portions 18, 22 have fixed thereto on the bottom thereof mounting pads 36, 38. The mounting pads 32, 34 are provided for attaching the rear portions 20, 24 to a rigid gear case 40, with the gear case 40 disposed rearwardly of such rear portions 20, 24. The mounting pads 36, 38 are provided for attaching the forwardly extending portions 18, 22 to a transversely disposed rigid hard bar 42 of the vehicle 12, with the hard bar 42 disposed beneath the forwardly extending portions 18, 22. A pair of ears 44, 46 are fixed to the brace 30 and relative to and generally parallel to the upwardly extending portions 26, 28 and in spaced apart relation thereto. Ear 44 is disposed inwardly of upwardly extending portion 26, and ear 46 is disposed inwardly of upwardly extending portion 28. The ear 44 and upwardly extending portion 26 define coaxial apertures 48, 50, and the ear 46 and the upwardly extending portion 28 define coaxial apertures 52, 54, the apertures 50, 54 being upwardly extending portion apertures.

Bracket 56 is removably mounted to the rear portion 20 of the side plate 14 by means of bolts 58, and defines bracket aperture 59. A second bracket, similar to bracket 56, is removably mounted to the rear portion 24 of the side plate 16.

In the use of the frame 10, as described in this embodiment, mounting pads 32, 34, 36, 38 are attached as previously described, as shown in FIG. 1. A roll-over protective structure 60 is fitted and held thereon by pins 62 disposed through apertures 48, 50 and apertures 52, 54 to secure ears 64 of the roll-over protective structure 60 thereto. The rear of the roll-over protective structure 60 is mounted on a pair of mounting bracket 66 secured to the gear case 40. A bulldozer arrangement 68 has a pair of push arms 70 (one shown) pivotally connected to lugs 72 extending forwardly from hard bar 42. Aperture 59 in bracket 56 receives a pin 74 for pivotally connecting a lift jack 76 of the bulldozer arrangement 68. The vehicle frame 10 described above provides a rigid mounting for securing the front of the roll-over protective structure 60 to the crawler tractor 12 and will be used only on the tractors that will be provided with a roll-over protective structure. However, some tractors will not have a roll-over protective structure mounted thereon and the upwardly extending portions 26, 28 of the side plates 14, 16 of the vehicle frame 10 are not needed. For such vehicles, the vehicle frame 10, and more particularly, the side plates 14, 16 will be modified during manufacture to omit the upwardly extending portions 26, 28 above the phantom lines indicated at A.

Figure 3:
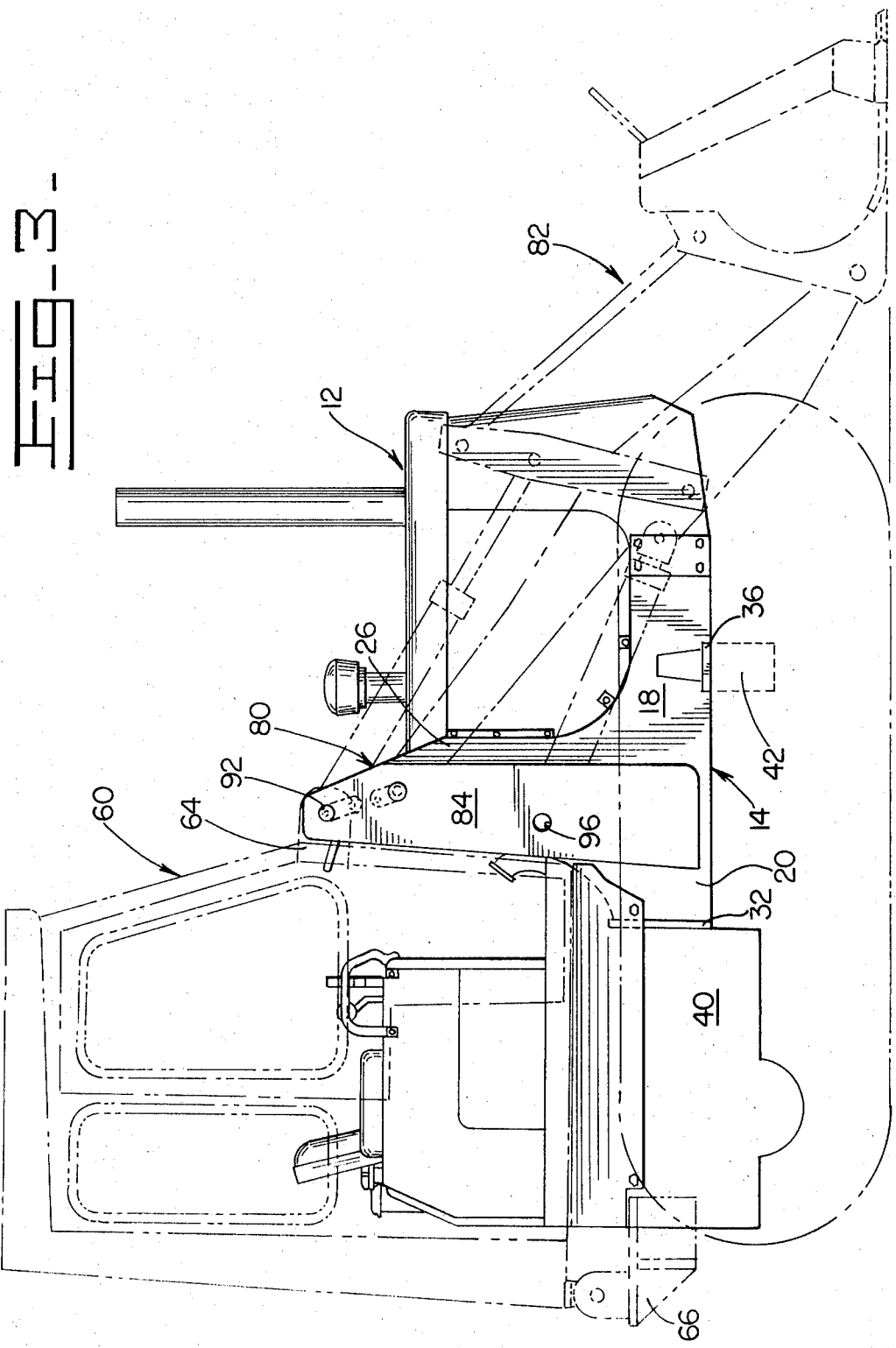
FIG. 3 is a side elevation of a vehicle incorporating the frame in another form thereof.
Figure 4:
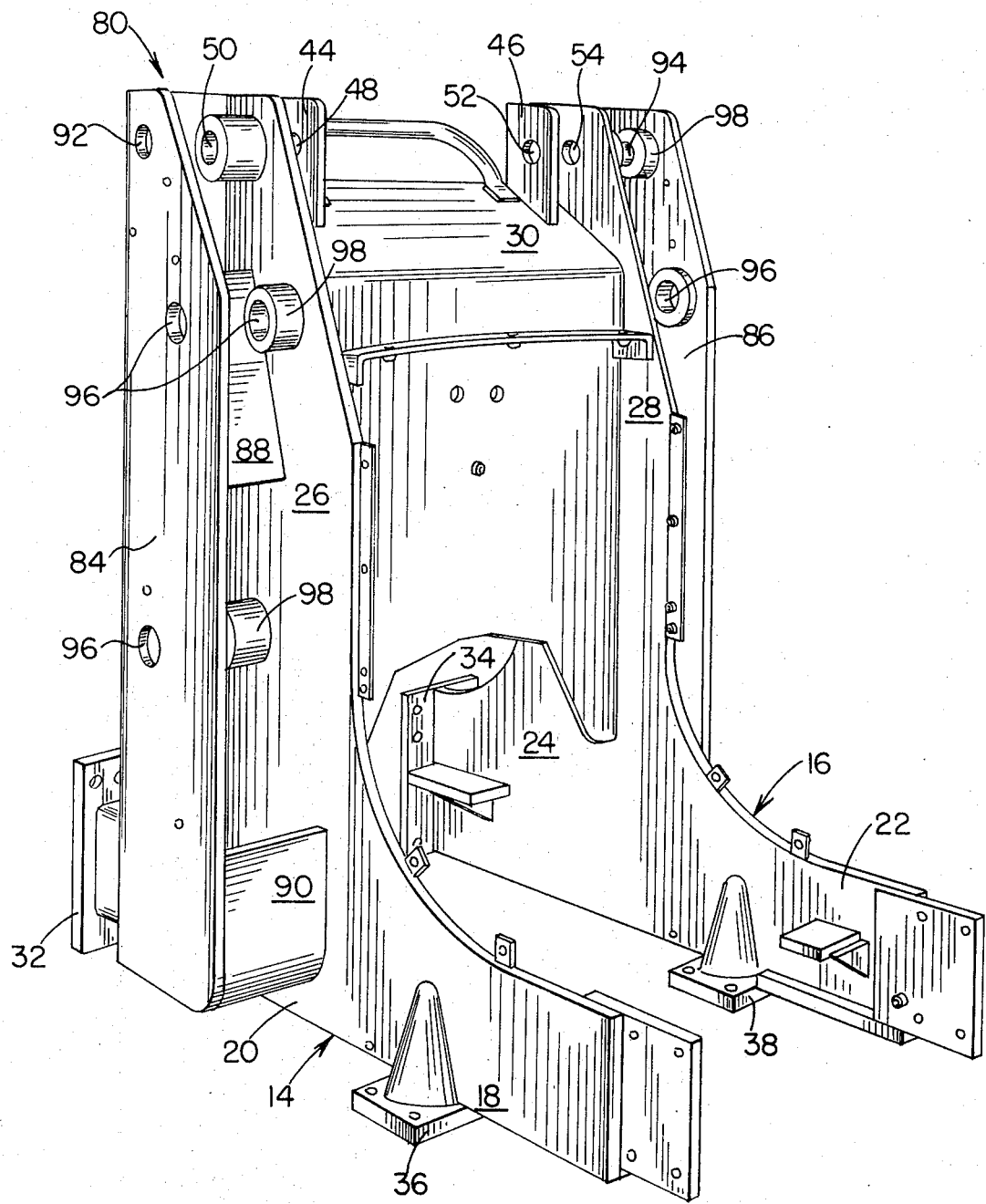
FIG. 4 is a perspective view of the frame as incorporated in the vehicle of FIG. 3.

The vehicle frame 10, as first described in reference to FIGS. 1 and 2, may also be converted to a loader frame 80, which is shown in FIGS. 3 and 4, to mount a loader linkage 82 thereto. Such loader frame 80 has bracket 56 removed, and includes additional plates 84, 86 fixed relative to and generally parallel to the upwardly extending portions 26, 28 respectively and in spaced apart relation to and outwardly thereof, so as to form box-type structures, having vertical openings at their forward edges to receive parts of the loader linkage 82.

Reinforcing plates 88, 90 are disposed between the upwardly extending portions 26, 28 and additional plates 84, 86 as shown.

Additional plate 84 defines an aperture 92 coaxial with apertures 48, 50, and additional plate 86 defines an aperture 94 coaxial with apertures 52, 54. The additional plate 84, and upwardly extending portion 26, define additional pairs of coaxial apertures 96, as do the additional plate 86 and upwardly extending portion 28. A plurality of bosses 98 are included where appropriate. Through such apertures (and bosses), the loader linkage 82 may be properly pivotally mounted to the frame 80.

It is to be noted that, in the first embodiment, as pointed out previously, the basic design of the frame can be easily chosen to provide a rigid mount for a rollover protective structure 60, or as an alternative, such rigid mount can be omitted if not required. The removable brackets 56 lend to the adaptability of the structure, and, if omitted, allow for the additional plates 84, 86 to be provided for the mounting of the loader linkage 82.

The particular placement of the mounting pads 32, 34, 36, 38 insures that proper carrying and support of the frames 10, 80 and implements connected thereto are provided (by placement of pads 36, 38 with hard bar 42 therebeneath), and that rearward thrust loads on the implement are carried (by the rearward placing of pads 32, 34). The coaxial placing of apertures 48, 50, 92, and the coaxial placing of apertures 52, 54, 94 provide the advantage that only a single pin is needed in each of these sets to fix whatever parts are to be associated therewith to the frame.

What is claimed is:

1. A frame for a vehicle comprising: first and second generally parallel spaced-apart side plates, defining first and second forwardly extending portions and first and second rear portions respectively and first and second upwardly extending portions extending from the first and second rear portions respectively; brace means interconnecting the first and second upwardly extending portions; first and second ears fixed relative to and generally parallel to the first and second upwardly extending portions respectively and in spaced-apart relation thereto; the first ear and first upwardly extending portion defining coaxial apertures, and the second ear and second upwardly extending portion defining coaxial apertures; and means for attaching said first and second side plates relative to the vehicle, wherein the first and second ears are fixed to the brace means, wherein the first and second ears are disposed inwardly of the first and second upwardly extending portions.

2. The frame of claim 1 and further comprising first and second brackets removably mounted to the first and second rear portions of the first and second side plates, and defining first and second bracket apertures therethrough respectively.

3. The frame of claim 1 and further comprising first and second additional plates fixed relative to and generally parallel to the first and second upwardly extending portions respectively and in spaced-apart relation thereto and outwardly thereof, the first additional plate defining a first upper aperture coaxial with the coaxial apertures defined by the first upwardly extending portion and first ear, and the second additional plate defining a second upper aperture coaxial with the coaxial apertures defined by the second upwardly extending portion and second ear.

4. The frame of claim 3 wherein the first additional plate and first upwardly extending portion define additional pairs of coaxial apertures, and the second additional plate and second upwardly extending portion define additional pairs of coaxial apertures.

5. In a vehicle having first rigid means and second rigid means forward of said first rigid means; a frame having first and second generally parallel spaced-apart side plates defining first and second forwardly extending portions and first and second rear portions respectively; means for attaching the first and second rear portions to the first rigid means with the first rigid means disposed rearwardly of the first and second rear portions; and, means for attaching the first and second forwardly extending portions to the second rigid means with the second rigid means disposed beneath the first and second forwardly extending portions; and further comprising first and second upwardly extending portions extending from the first and second rear portions respectively and defining first and second upwardly extending portion apertures respectively; and further comprising first and second ears fixed relative to and generally parallel to the first and second upwardly extending portions respectively and in spaced-apart relation thereto, the first ear defining an aperture coaxial with the first upwardly extending portion aperture, and the second ear defining an aperture coaxial with the second upwardly extending portion aperture, wherein the first and second ears are disposed inwardly of the first and second upwardly extending portions, and further comprising first and second additional plates fixed relative to and generally parallel to the first and second upwardly extending portions respectively and in spaced-apart relation thereto and outwardly thereof, the first additional plate defining a first upper aperture coaxial with the coaxial apertures defined by the first upwardly extending portion and first ear, and the second additional plate defining a second upper aperture coaxial with the coaxial apertures defined by the second upwardly extending portion and second ear.

6. The vehicle of claim 5 wherein the first additional plate and first upwardly extending portion define additional pairs of coaxial apertures, and the second additional plate and second upwardly extending portions define additional pairs of coaxial apertures.

7. The vehicle of claim 6 and further comprising brace means interconnecting the first and second upwardly extending portions, with the first and second ears being fixed to the brace means.

* * * * *